United States Patent [19]

Orlando

[11] Patent Number: 5,788,087
[45] Date of Patent: Aug. 4, 1998

[54] HINGED WIRE MANAGEMENT PANEL ASSEMBLY

[75] Inventor: Stephen Orlando, Longboat Key, Fla.

[73] Assignee: Ortronics, Inc., Pawcatuck, Conn.

[21] Appl. No.: 619,933

[22] Filed: Mar. 18, 1996

[51] Int. Cl.⁶ .................................................. A47F 7/00
[52] U.S. Cl. .................................................. 211/26
[58] Field of Search .................... 211/26, 128, 13.1, 211/26.2

[56] References Cited

U.S. PATENT DOCUMENTS

| | | | |
|---|---|---|---|
| 3,471,029 | 10/1969 | Dolan | 211/26 X |
| 4,496,057 | 1/1985 | Zenitani et al. | 211/26 |
| 4,497,411 | 2/1985 | DeBortoli | 211/26 |
| 4,553,674 | 11/1985 | Yoshikawa et al. | 211/26 |
| 4,641,754 | 2/1987 | Hebel et al. | 211/26 |
| 5,165,770 | 11/1992 | Hahn | 211/26 X |
| 5,209,356 | 5/1993 | Chaffee | 211/26 |
| 5,307,942 | 5/1994 | Quelfeter et al. | 211/26 |
| 5,372,262 | 12/1994 | Benson et al. | 211/26 |

*Primary Examiner*—Alvin C. Chin-Shue
*Assistant Examiner*—Sarah L. Purol
*Attorney, Agent, or Firm*—St. Onge Steward Johnston & Reens LLC

[57] ABSTRACT

A hinged wire management panel assembly with two panels hingedly connected by a plurality of hooks integrally-formed in one panel (a wire management panel) which engage slots formed in a second panel (a patch panel.) The hooks have free ends with straight portions which engage the slots when the two panels are mounted to a common rack thereby forming the hinge connection. The hooks also have curved portions which allow the patch panel to slide along the hooks and simultaneously rotate outward when the patch panel is disconnected from the rack. The wire management panel includes wire management brackets which limit the rotation of the patch panel when the patch panel is horizontal.

20 Claims, 5 Drawing Sheets

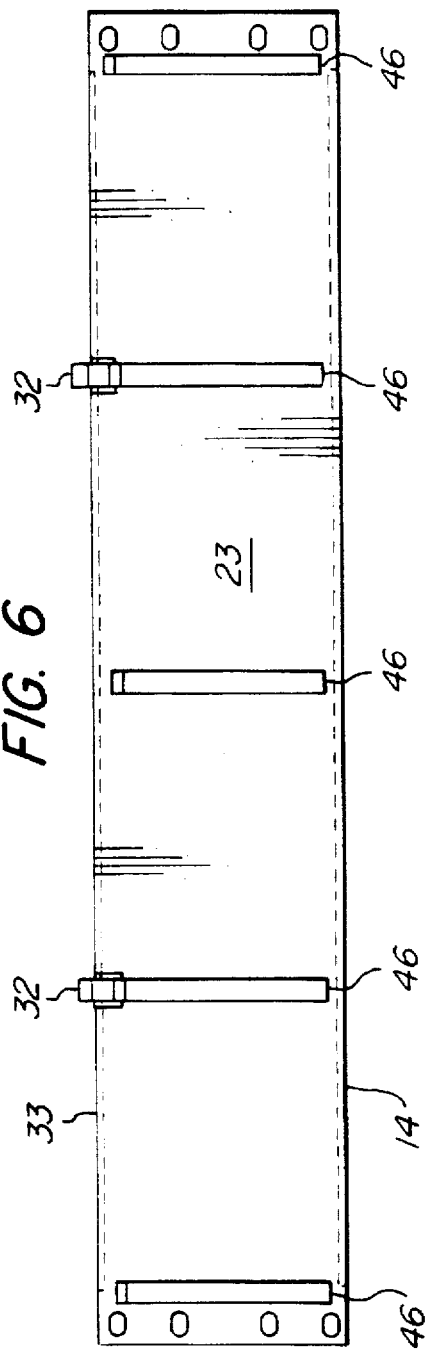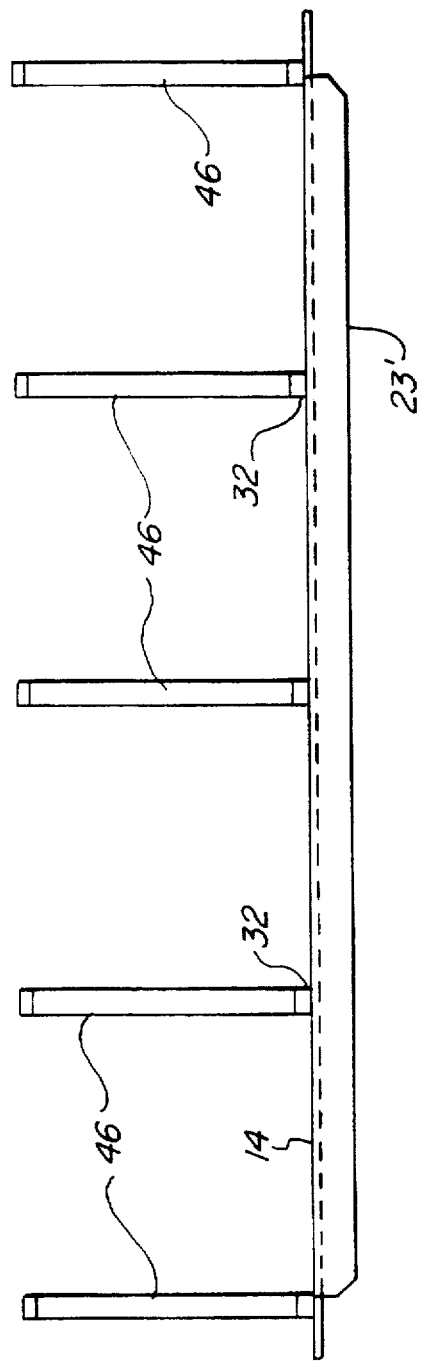

5,788,087

HINGED WIRE MANAGEMENT PANEL ASSEMBLY

TECHNICAL FIELD

This invention relates to rack-mountable wire management systems and specificly to wire management assemblies having hinged patch panels.

BACKGROUND ART

Modern buildings, particularly commercial buildings, require an effective and efficient telecommunications infrastructure to support the wide variety of services that rely on the electronic transport of information.

Typically, wiring systems within buildings are terminated in a central wiring closet where they may be interconnected to one another and/or to other cabling systems. Patch panels are often used as the means to terminate cables in these wiring closets. These patch panels are commonly mounted on racks and often include modular ports, such as RJ-45 ports, for interconnecting the terminated cables to other cables or telecommunications equipment. The patch panels are typically integrated with (or placed immediately adjacent to) wire management panels which include brackets to support and direct the cables connected to the front of the patch panel.

While patch panels provide a convenient way to access and change the connections on the front of the panel, it is often difficult to access the rear of the patch panel in order to change or service the wires connected thereto. Typically, the patch panel is connected to a rack by bolts or screws all of which must be removed to access the rear unless there is full access to the rear of the rack (requiring a substantial amount of otherwise wasted closet space, which in most cases is at a premium). Once all the fasteners are removed, the panel is completely unsupported making it difficult to work with and increasing the likelihood that the connections to the rear may become damaged.

One solution to this problem is to permanently connect the patch panel to another panel, such as a wire management panel, with standard plate hinges —the wire management panel being below the patch panel. The plate hinges may be attached to either the front or the back of the panels. With a hinged assembly of this type, once all the fasteners are removed from the patch panel, the patch panel can rotate downward, exposing the rear portion for maintenance —the downward rotation of the patch panel being limited by the wire management brackets. The patch panel is secured and remains stable during maintenance due to the hinged connection to the wire management panel.

This is an effective design, however, the types of hinges used in prior designs require that the two panels be semi-permanently connected to one another thus limiting the ability (or at least increasing the time) to rearrange the panels. Also, the past designs require that the two panels and hinges be pre-assembled, resulting in increased manufacturing time and expense. Moreover, the hinge plates of previous designs occupy a significant amount of the panel surface area. As with most telecommunications termination systems, space is at a premium. Likewise, with patch panels, this use of space is undesirable because it reduces the area available for connections.

Therefore, it would be desirable to have a hinged wire management panel assembly which includes a temporary, readily detachable hinge, which does not require pre-assembly, and which occupies a minimum amount of panel surface area.

DISCLOSURE OF THE INVENTION

Accordingly, it is an object of the invention to provide a wire management panel assembly having a patch panel hingedly connected to a wire management panel.

It is another object of the invention to provide a wire management panel assembly with the above character having a hinge assembly which is easily assembled and readily detachable.

It is a further object of the invention to provide a wire management panel assembly with the above character having a hinge assembly which occupies a minimum amount of panel surface area.

It is yet another object of the invention to provide a wire management panel assembly with the above character having hooks attached to a wire management panel which are aligned to engage slots formed in a patch panel.

It is still another object of the invention to provide a wire management panel assembly with the above character having hooks with free ends with straight portions which fit within the slots in the patch panel when the panels are mounted on a rack.

It is another object of the invention to provide a wire management panel assembly with the above character with hooks having curved portions which allow the patch panel to rotate downward to provide access to the rear portion thereof when the patch panel is detached from the rack.

It is another object of the invention to provide a wire management panel assembly with the above character having a wire management panel with wire management brackets which are aligned to stop the rotation of the patch panel when the patch panel is substantially perpendicular to the wire management panel (i.e. when the patch panel is horizontal.)

It is another object of the invention to provide a wire management panel assembly with the above character having hooks which are formed integrally and in one piece with the wire management panel.

These and other objects are achieved by the present invention, which provides a wire management panel assembly with two panels hingedly connected by a plurality of hooks integrally-formed in one panel (a wire management panel) which fit within slots formed in a second panel (a patch panel). The hooks have free ends with straight portions which fit within the slots when the two panels are mounted to a common rack thereby forming the hinge connection. The hooks also have curved portions which allow the patch panel to slide along the hooks and simultaneously rotate outward when the patch panel is disconnected from the rack. The wire management panel includes wire management brackets which limit the rotation of the patch panel when the patch panel is horizontal.

These and other preferred aspects of the invention are described in more detail below.

BRIEF EXPLANATION OF THE FIGURES

The invention will be better understood and its advantages will be better appreciated from the following detailed description, especially when read in light of the accompanying drawings, wherein.

3

Figure 3:
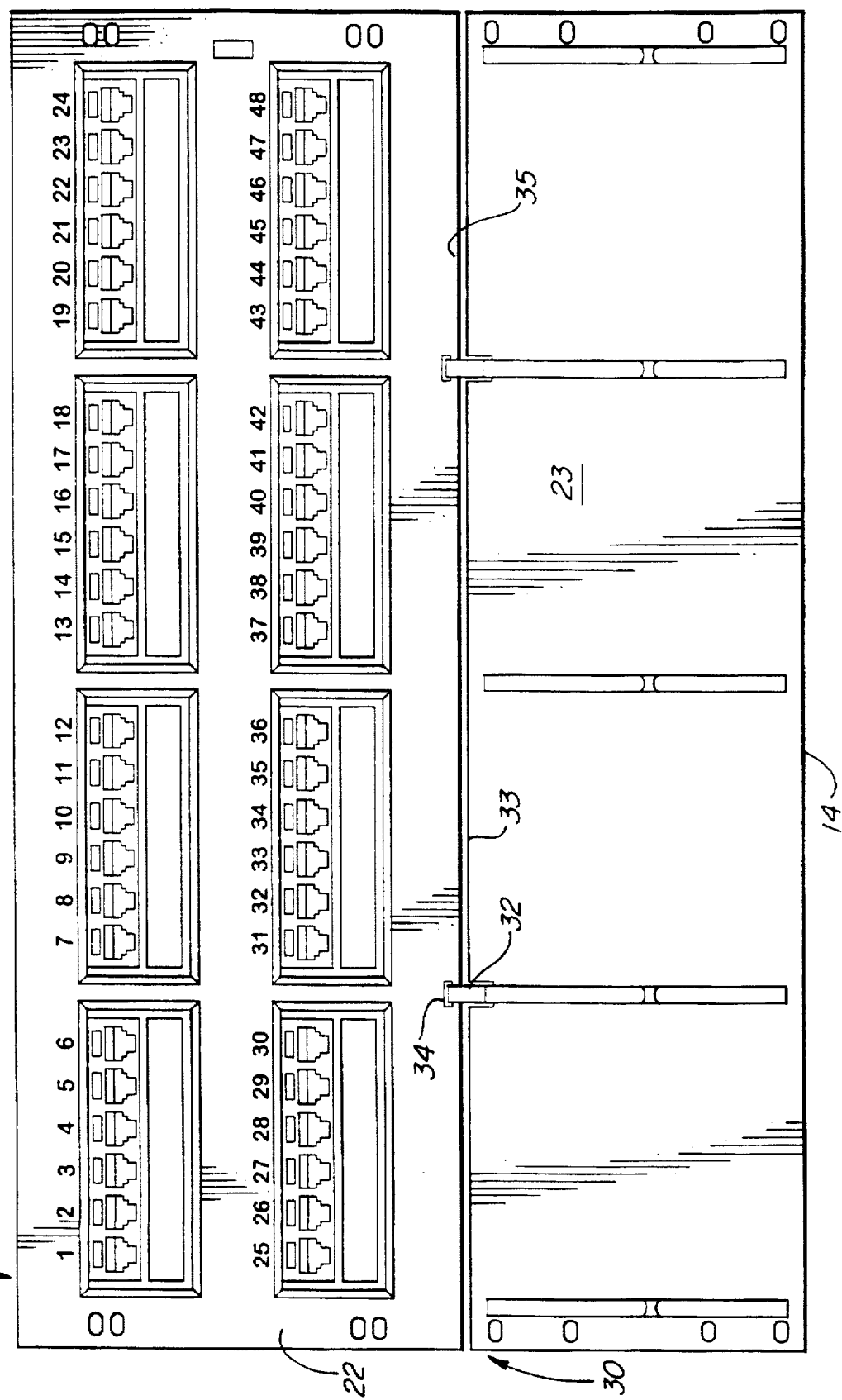
Figure 4:
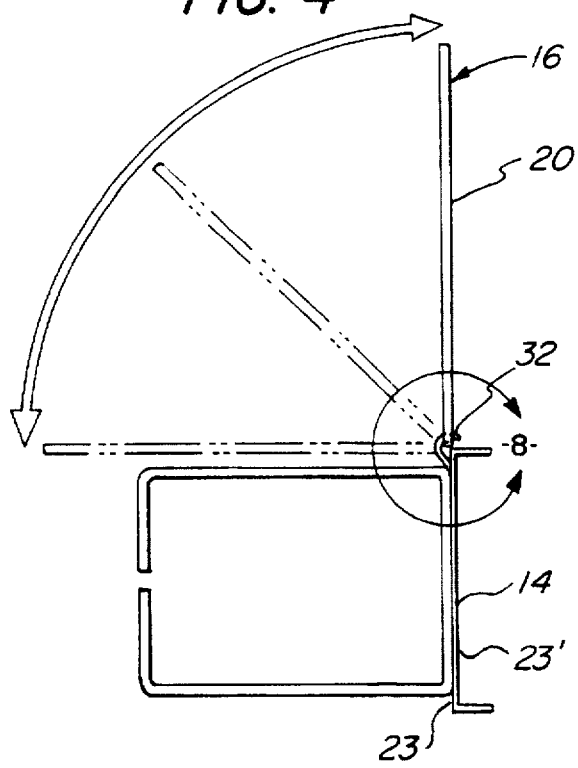
Figure 5:
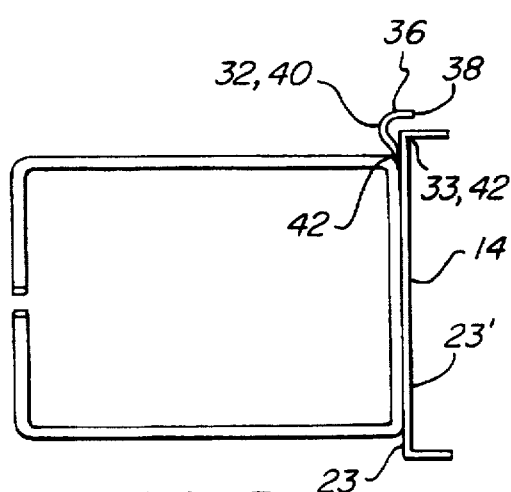
Figure 8:
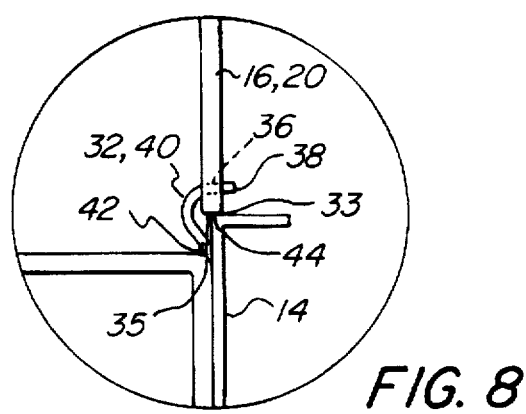

FIG. 3 is a front elevation view of the hinged panel assembly of the present invention showing the hooks in the wire management panel engaged with the slots in the patch panel;

FIG. 4 is an end elevation view of the hinged panel assembly of the present invention showing the hinged rotation of the patch panel with respect to the wire management panel;

FIG. 5 is an end elevation view of the wire management panel of the present invention showing the integrally-formed hooks and the wire management brackets aligned therewith;

FIG. 6 is a front elevation view of the wire management panel of FIG. 5;

FIG. 7 is a top plan view of the wire management panel of FIG. 5 and;

FIG. 8 is an enlarged drawing of the portion of the panel enclosed within the circular arrow 8 in FIG. 4.

BEST MODES FOR CARRYING OUT THE INVENTION

Figure 1:
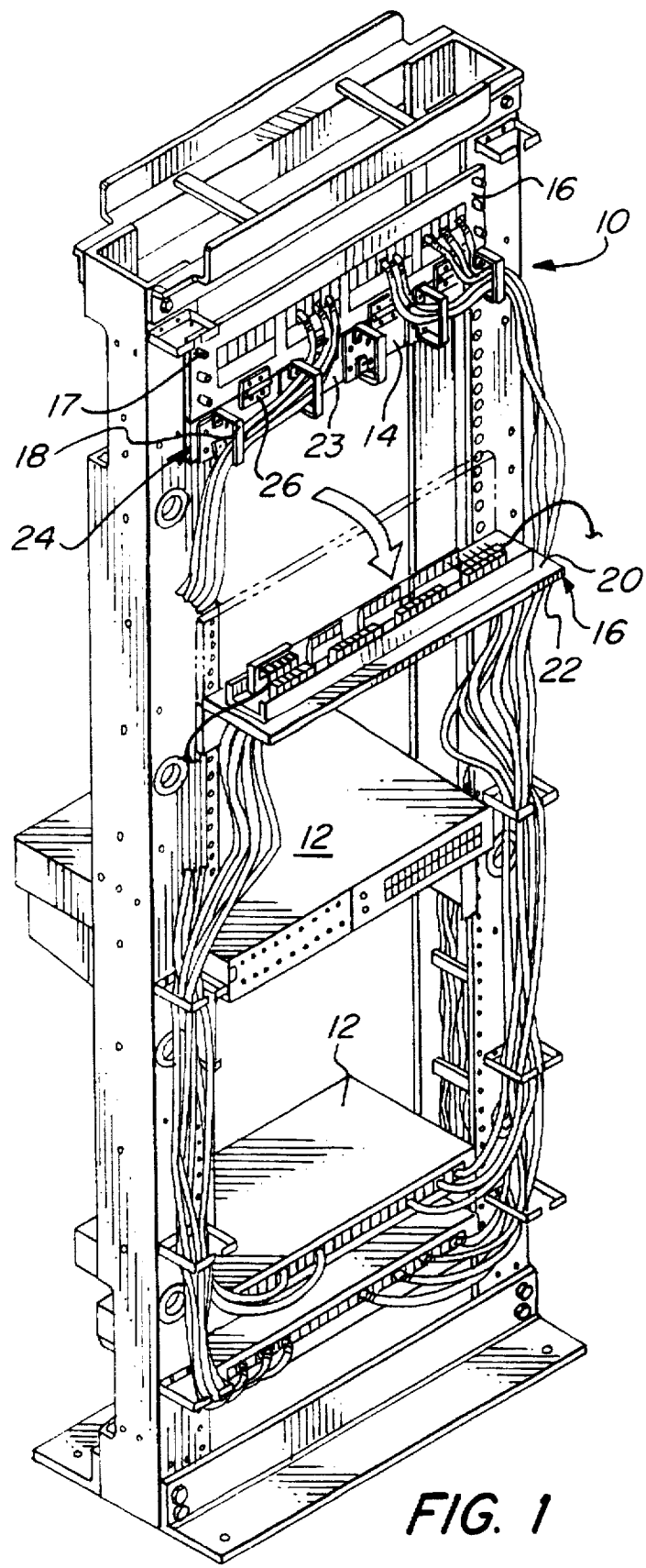
FIG. 1 is an isometric view of a telecommunications wire management rack supporting patch panels, wire management panels, and other telecommunications equipment.

Referring to FIG. 1, a telecommunications wire management rack 10 may support a number of pieces of telecommunications equipment 12, as well as wire management panels 14 and patch panels 16. Typically, wire management panels 14 are used to direct cables 18 to patch panels 16 and are therefore mounted adjacent one another. All components, including wire management panels 14 and patch panels 16 are rigidly connected to rack 10 by bolts or screws 17.

Patch panels 16 typically include snap-in, easily changeable connections on the front surface 22 (such as RJ-45 sockets) and semi-permanent connections on the rear portion 20. Occasionally however, the wires connected to the rear 20 need to be accessed for changes or maintenance.

Prior art hinged panel assemblies 24 employ standard plate hinges 26 attached between adjacent wire management panels 14 and patch panels 16. Typically, prior art hinges are attached to the front surfaces 22, 23 of patch and wire management panels 16, 14. Thus, when screws 17 are removed from patch panel 16, patch panel 16 can be rotated downward to access the rear portion 20.

Figure 2:
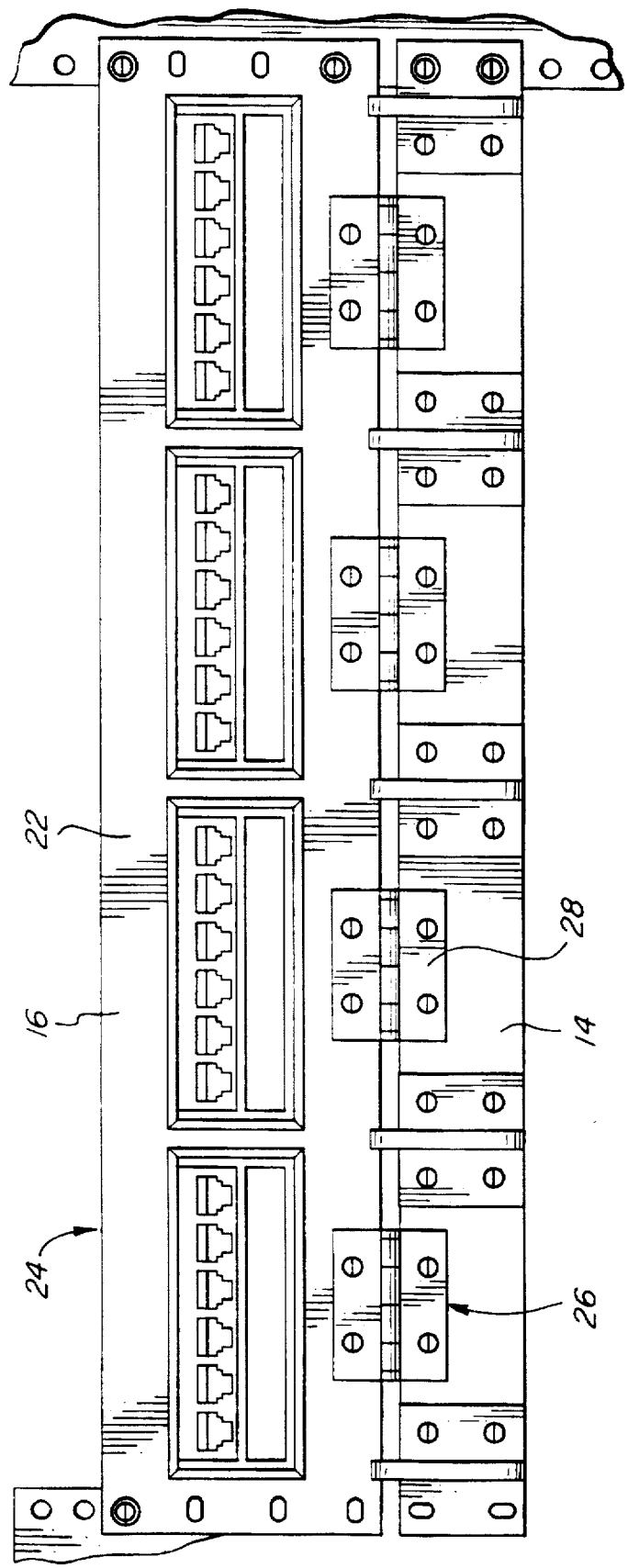
FIG. 2 is a front elevation view of a prior art hinged panel assembly showing the substantial area occupied by the hinge plates.

Referring to FIG. 2, prior art hinged panel assemblies 24 employ standard plate hinges 26 which are affixed to wire management panel 14 and patch panel 16 by the plates 28. Plates 28 occupy a significant amount of the front surface 22 of patch panel 16 thereby reducing the area available for port connections.

Referring to FIG. 3, the hinged panel assembly of the present invention 30 includes hooks 32 disposed along the edge 33 of wire management panel 14 and which engage slots 34 (adjacent edge 35) formed in patch panel 16.

Hooks 32 and slots 34 provide for a hinged connection between wire management panel 14 and patch panel 16 without the use of significant area of front surface 22 of patch panel 16.

Referring to FIGS. 4 and 5, when screws (not shown) are removed from patch panel 16, patch panel 16 may rotate away from rack (also not shown) to provide access to the rear portion 20 thereof. Hooks 32 include straight portions 36 near the free end 38 which allow hooks 32 to engage slots 34 when the panels are mounted to a telecommunications rack. It can be seen from the drawing that rear surface 23' of the panel 14 defines a plane substantially aligned with that back surface. Straight portions 36 are substantially perpendicular to (or more accurately, substantially normal to) wire management panel 14 such that hooks 32 fit within slots 34

4 when the panels are mounted. Hooks 32 also include curved portions 40 which allow patch panel 16 to rotate outward. The curved portions 40 are located between straight portions 36 and the attached end 42. Preferably, curved portions 40 have a center of curvature 44 which is adjacent the edge 33 of wire management panel 14. Thus, hooks 32 extend outwardly from attached end 42 and arc around the edge 33 of wire management panel 14, crossing the plane of the front surface 23 of wire management panel 14.

Preferably, hooks 32 are integrally-formed in wire management panel 14 by means of a cut-out in the panel material. Also, wire management panel 14 preferably includes brackets 46 to support and direct cables 18 leading to patch panel 16. Brackets 46 may also serve to limit the downward rotation of patch panel 16 thereby providing stability during maintenance.

Referring to FIG. 6 and 7, hooks 32 are preferably disposed along edge 33 of wire management panel 14 and are preferably aligned with brackets 46.

It will be appreciated that in the above description, references to specific types of panels such as wire management panels and patch panels are used for the purposes of clarity and are not intended as limitations or qualifications of the present invention. Other panel types and configurations are within the contemplation of the invention. Also, the above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention as defined in the appended claims.

What is claimed is:

1. A wire management panel comprising
   a front surface and a back surface, said front surface having an edge and said back surface defining
      a plane substantially aligned with said back surface;
      a plurality of hooks disposed adjacent said edge, said hooks having ends attached to said panel, having free ends, having straight portions adjacent said free ends, and having curved portions between said straight portions and said attached ends;
      said straight portions being substantially perpendicular to said plane;
      said hooks having portions extending away from said front surface and having portions arcing around said edge; and
      said straight portions extending through said plane.

2. A wire management panel as in claim 1 wherein said hooks are integrally-formed in one piece with said panel.

3. A wire management panel as in claim 1 wherein said attached ends of said hooks fall on a line substantially parallel said edge and further comprising a plurality of wire management brackets attached to said front surface, said brackets having arms extending from said front surface, and said arms having portions adjacent a plane substantially perpendicular to said front surface and passing through said line.

4. A wire management panel as in claim 2 wherein said attached ends of said hooks fall on a line substantially parallel said edge and further comprising a plurality of wire management brackets attached to said front surface, said brackets having arms extending from said first side, and said arms having portions adjacent a plane substantially perpendicular to said front surface and passing through said line.

5. A wire management panel as in claim 3 wherein said curved portions of said hooks further comprise centers of curvature adjacent said edge of said front surface of said panel.

6. A wire management panel as in claim 4 wherein said curved portions of said hooks further comprise centers of curvature adjacent said edge of said front surface of said panel.

7. A wire management panel assembly comprising:
   a first wire management panel having a front surface, a back surface, an edge, and a plurality of hooks disposed adjacent said edge;
   a second patch panel having a back surface, an edge and a plurality of slots disposed adjacent said edge, said slots being sized and shaped to accept one of said hooks, and said second panel being hingedly attached to said first panel by said hooks and said slots;
   said assembly having a first position in which said edges of said first and second panels are substantially parallel and in which said back surfaces of said first and second panels are substantially parallel, and said assembly having a second position in which said edges of said first and second panels are substantially parallel and in which said back surfaces of said first and second panels are substantially perpendicular; and
   said hooks being aligned to engage said slots when said assembly is in said first and second positions to allow said second panel to pivot with respect to said first panel between said first and second positions.

8. A wire management panel assembly as in claim 7 further comprising:
   a plane aligned with said back surface of said first panel;
   said hooks having ends attached to said first panel, having free ends, having straight portions adjacent said free ends and having curved portions between said straight portions and said attached ends, said straight portions being substantially perpendicular to said plane; portions of said hooks extending away from said front surface of said first panel, portions of said hooks arcing around said edge of said first panel and said straight portions extending through said plane; and
   said slots surrounding part of said straight portions of said hooks when said assembly is in said first position, and said slots surrounding part of said curved portions of said hooks when said assembly is in said second position.

9. A wire management panel assembly as in claim 8 further comprising a plurality of wire management brackets attached to said front surface of said first panel, said brackets having arms extending from said front surface of said first panel, said arms having portions adjacent a plane substantially perpendicular to said first panel and passing through a line aligned with said attached ends of said hooks such that said arms limit the rotation of said second panel with respect to said first panel when said first and second panels are approximately perpendicular.

10. A wire management panel assembly as in claim 9 wherein said hooks are integrally formed in one piece with said first panel.

11. A wire management panel assembly as in claim 10 wherein said curved portions of said hooks have centers of curvature adjacent said edge of said first panel.

12. A wire management panel assembly comprising:
   a first wire management panel having an edge, having a front surface, having a back surface, and having a plane aligned with said back surface;
   a second patch panel hingedly attached to said first panel, said second panel having and edge;
   a plurality of hooks attached to said first panel;
   a plurality of slots in said second panel, said slots being disposed along a line substantially parallel said edge of said second panel, said slots being aligned, shaped and sized to accept one of said hooks;
   said hooks having ends attached to said first panel, having free ends, having straight portions adjacent said free ends, and having curved portions between said straight portions and said attached ends, said straight portions being substantially perpendicular to said front surface; said hooks having portions extending away from said front surface of said first panel and having portions arcing around said edge of said first panel, said straight portions extending through said plane;
   said assembly having a first position in which said edges of said first and second panels are substantially parallel one another and in which said back surfaces of said first and second panels are substantially parallel, and said assembly having a second position in which said edges of said first and second panels are substantially parallel one another and in which said back surfaces of said first and second panels are substantially perpendicular; and
   said slots surrounding parts of said straight portions of said hooks when said assembly is in said first position, and said slots surrounding parts of said curved portions of said hooks when said assembly is in said second position.

13. An assembly as in claim 12 wherein said hooks are integrally formed in one piece with said first panel.

14. An assembly as in claim 13 wherein said curved portions of said hooks have centers of curvature adjacent said edge of said first panel.

15. A wire management panel assembly as in claim 14 further comprising said attached ends being aligned with a line substantially parallel said edge of said first panel; and further comprising a plurality of wire management brackets attached to said front surface of said first panel, said brackets having arms with portions adjacent a plane perpendicular to said front surface of said first panel and passing through said line substantially parallel said edge of said first panel; said arms being aligned to limit the rotation of said second panel relative to said first panel when said second panel is substantially perpendicular to said first panel.

16. An assembly as in claim 15 wherein said hooks are integrally formed in one piece with said first panel.

17. A wire management panel assembly as in claim 16 wherein said hooks are symetrical and wherein said slots are symetrical.

18. A telecommunications management system comprising:
   a wire management rack;
   a wire management panel attached to said wire management rack, said wire management panel having an edge, having a front surface and having a back surface;
   a patch panel releasably attached to said wire management rack and hingedly attached to said wire management panel, said patch panel having an edge and having a plurality of slots therethrough; said slots being displaced along a line substantially parallel to said edge of said patch panel;
   a plurality of hooks having ends attached to said wire management panel, said hooks having free ends, having straight portions adjacent said free ends, and having curved portions between said straight portions and said attached ends, said straight portions of said hooks being substantially perpendicular to said front surface, said hooks having portions extending away from said front surface of said wire management panel and having portions arcing around said edge of said wire management panel, said straight portions extending through said plane aligned with said back surface of said wire management panel.

19. A telecommunications management system as in claim 18:

wherein said patch panel further comprises a back surface;

further comprising said patch panel having a first position in which said edges of said patch panel and said wire management panel are substantially parallel and in which said back surfaces of said patch panel and said wire management panel are substantially parallel, and said patch panel having a second position in which said edges of said patch panel and said wire management panel are substantially parallel and in which said back surfaces of said patch panel and said wire management panel are substantially perpendicular; said hooks being aligned to engage said slots when said patch panel is in said first and second positions to allow said patch panel to pivot with respect to said wire management panel between said first and second positions; and said slots surrounding parts of said straight portions of said hooks when said patch panel is in said first position, and said slots surrounding parts of said curved portions of said hooks when said patch panel is in said second position.

20. A telecommunications management system as in claim 19 wherein said hooks are integrally-formed in one piece with said wire management panel.

* * * * *